(12) United States Patent
Zheng

(10) Patent No.: US 10,209,446 B2
(45) Date of Patent: Feb. 19, 2019

(54) OPTICAL FIBER ASSEMBLIES AND METHODS FOR FORMING SAME

(71) Applicant: AFL TELECOMMUNICATIONS LLC, Duncan, SC (US)

(72) Inventor: Wenxin Zheng, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/573,380

(22) PCT Filed: May 13, 2016

(86) PCT No.: PCT/US2016/032296
§ 371 (c)(1),
(2) Date: Nov. 10, 2017

(87) PCT Pub. No.: WO2016/191127
PCT Pub. Date: Dec. 1, 2016

(65) Prior Publication Data
US 2018/0136396 A1  May 17, 2018

Related U.S. Application Data

(60) Provisional application No. 62/165,457, filed on May 22, 2015.

(51) Int. Cl.
| G02B 6/255 | (2006.01) |
| G02B 6/25 | (2006.01) |
| G02B 6/32 | (2006.01) |
| G02B 6/028 | (2006.01) |

(52) U.S. Cl.
CPC ......... G02B 6/2551 (2013.01); G02B 6/0288 (2013.01); G02B 6/25 (2013.01); G02B 6/32 (2013.01); *G02B 6/2553* (2013.01); *G02B 6/2555* (2013.01)

(58) Field of Classification Search
None
See application file for complete search history.

(56) References Cited

U.S. PATENT DOCUMENTS

| 5,037,174 A | 8/1991 | Thompson |
| 2003/0053751 A1 | 3/2003 | Ukrainczyk et al. |
| 2012/0057841 A1 | 3/2012 | Wysocki et al. |

OTHER PUBLICATIONS

AFL Telecommunications LLC; International Patent Application No. PCT/US2016/032296; International Search Report dated Aug. 16, 2016; (1 page).

*Primary Examiner* — Jerry Rahll
(74) *Attorney, Agent, or Firm* — Dority & Manning, P.A.

(57) ABSTRACT

A method for forming an optical fiber assembly includes splicing a first fiber and a second fiber together. The first fiber is one of a single mode optical fiber or a multi-mode optical fiber and the second fiber is a coreless silica fiber. The method further includes heating the second fiber, and applying a tensile force to the second fiber during heating of the second fiber. The method further includes discontinuing application of the tensile force when a minimum neck thickness of the second fiber is below a neck thickness threshold. The method further includes discontinuing heating after discontinuing application of the tensile force and after the second fiber has separated into a tip portion and a detached portion, the tip portion connected to the first fiber.

14 Claims, 2 Drawing Sheets

OPTICAL FIBER ASSEMBLIES AND METHODS FOR FORMING SAME

PRIORITY STATEMENT

The present application is based upon and claims the benefit of priority to U.S. Provisional Patent Application Ser. No. 62/165,457, filed May 22, 2015 in the United States Patent and Trademark Office, and as a U.S. national stage filing of International Application No. PCT/US2016/032296 having an international filing date of May 13, 2016, the disclosures of both of which are incorporated by reference herein in their entireties.

FIELD OF THE INVENTION

The present disclosure is generally directed to optical fiber assemblies and methods for forming optical fiber assemblies.

BACKGROUND OF THE INVENTION

Optical fibers can have tips with varying shapes, and these varying shapes may be utilized in a wide variety of settings and applications. Examples of tip shapes include "up" tapers, "down" tapers, convex lenses, concave lenses, spherical ball lenses, diffusers, side-fires, and angled ends. One particular application in which particular tip shapes are useful is in the medical field. For example, ball lens shaped tips can be utilized for materials processing and tissue cutting. Down taper tips can be utilized for tissue ablation.

For tissue ablation, 360 degree near-uniform beam propagation from a tip is required. However, achieving such beam propagation is difficult. For example, optical fibers alone with normal cleaves can only obtain between approximately 5 degree and approximately 40 degree divergent beam radiation. Some tip designs utilized $TiO_2$ flakes in silicon matrices by splicing the matrices to the cleaved optical fiber, but these tips are not all-fiber structures and are relatively expensive. Doric lens diffusers are also not all-fiber structures and cannot obtain 360 degree near-uniform beam propagation.

Accordingly, improved optical fiber assemblies with down taper tips, and improved methods for forming such assemblies, are desired. In particular, methods and assemblies which provide 360 degree near-uniform beam propagation and are inexpensive, all-fiber structures would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for forming an optical fiber assembly is provided. The method includes splicing a first fiber and a second fiber together. The first fiber is one of a single mode optical fiber or a multi-mode optical fiber and the second fiber is a coreless silica fiber. The method further includes heating the second fiber, and applying a tensile force to the second fiber during heating of the second fiber. The method further includes discontinuing application of the tensile force when a minimum neck thickness of the second fiber is below a neck thickness threshold. The method further includes discontinuing heating after discontinuing application of the tensile force and after the second fiber has separated into a tip portion and a detached portion, the tip portion connected to the first fiber.

In exemplary embodiments, a method in accordance with the present disclosure further includes heat polishing a tip of the tip portion to a desired tip angle.

In accordance with another embodiment of the present disclosure, an optical fiber assembly is provided. The optical fiber assembly includes a first fiber. The first fiber is one of a single mode optical fiber or a multi-mode optical fiber. The optical fiber assembly further includes a tip portion connected to the first fiber. The tip portion comprising a tip having a down-tapered shape. The tip portion is a coreless silica fiber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
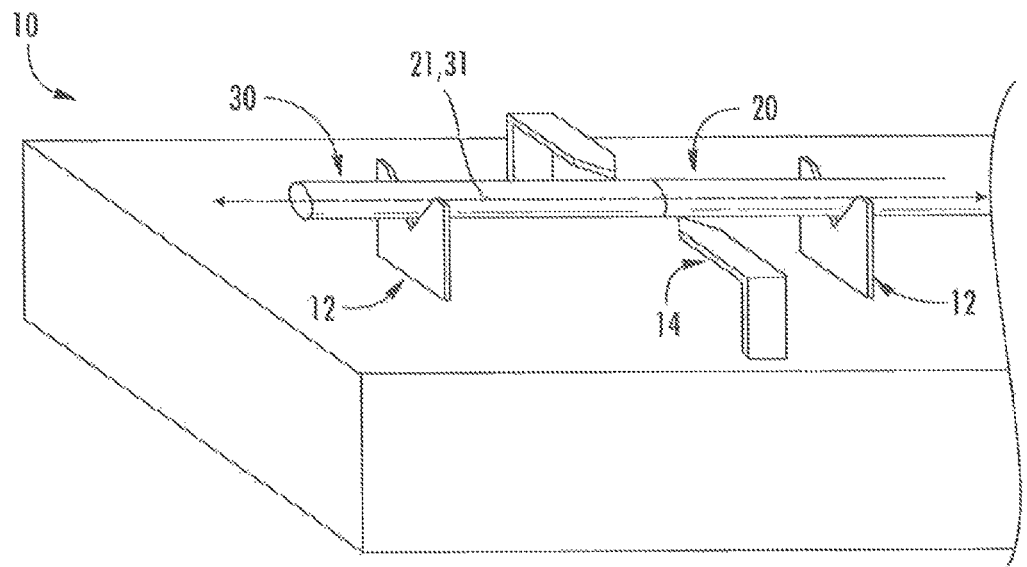
FIG. 1 is a schematic perspective view of fibers positioned in a splicers for formation of an optical fiber assembly in accordance with embodiments of the present disclosure.
Figure 2:
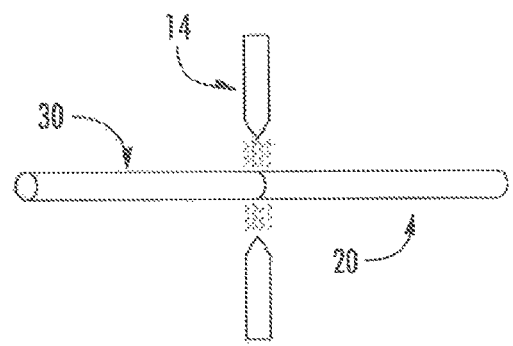
FIG. 2 is a schematic top view of a first fiber and second fiber being spliced together in accordance with embodiments of the present disclosure.
Figure 3:
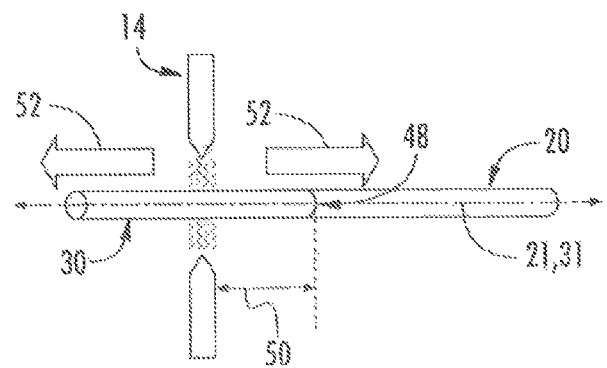
FIG. 3 is a schematic top view of a heat and a tensile force being applied to a second fiber in accordance with embodiments of the present disclosure.
Figure 4:
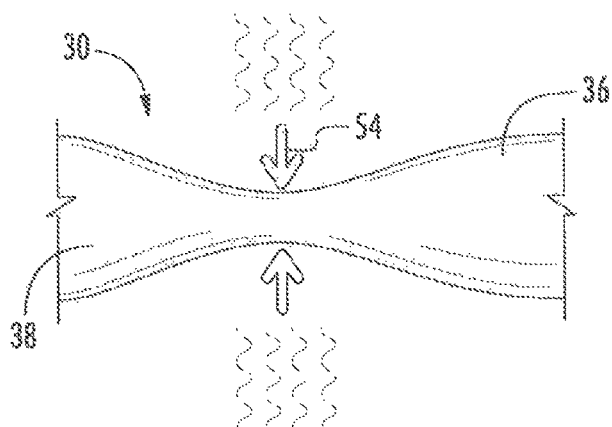
FIG. 4 is a schematic top view of a second fiber after application of a tensile force in accordance with embodiments of the present disclosure.
Figure 5:
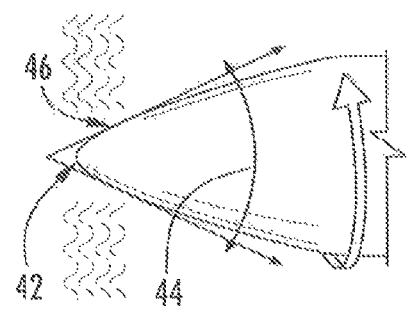
FIG. 5 is a schematic top view of a tip portion of a second fiber during heat polishing in accordance with embodiments of the present disclosure.
Figure 6:
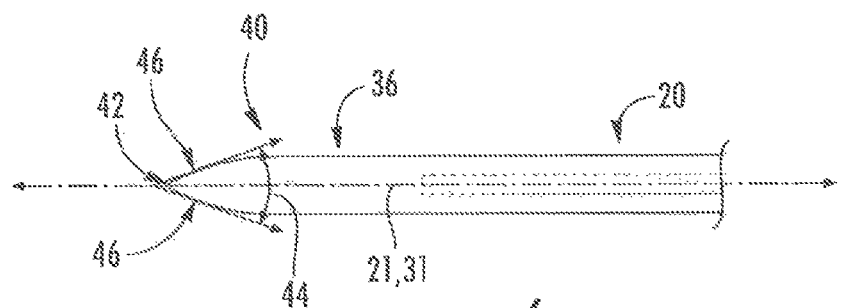
FIG. 6 is a schematic top view of an optical fiber assembly in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to methods for forming optical fiber assemblies and the resulting optical fiber assemblies. An optical fiber assembly in accordance with the present disclosure includes a first fiber and a tip portion of a second fiber. The first fiber may be a single mode optical fiber or multi-mode optical fiber. The second fiber may be a coreless silica fiber. The first and second fibers may be spliced together, and the second fiber may further be manipulated such that a tip of the second fiber has a down-taper tip (i.e. a tip that tapers downward to a terminus of the fiber). Optical fiber assemblies, such as those produced by methods as disclosed herein, advantageously provide improved beam-propagation and are relatively inexpensive to produce. In particular, 360 degree near-uniform beam propagation can be obtained. Optical fiber assemblies in accordance with the present disclosure are thus particularly useful in suitable down-taper application, such as tissue ablation.

Referring now to FIG. 1, one embodiment of fibers utilized for the formation of an optical fiber assembly in accordance with the present disclosure are illustrated as disposed within a splicer 10 for formation of the optical fiber assembly. The splicer 10 may generally include supports 12 on which fibers may be disposed for splicing operations, and may further include various apparatus for moving the fibers, positioning the fibers relative to each other, applying tensile forces to the fibers, and/or otherwise manipulating the fibers, as is generally understood. A splicer 10 may further include a heat source 14, as illustrated. The heat source 14 may generate heat to splice fibers together and to otherwise manipulate the fibers, as discussed herein.

Any suitable splicer 10 may be utilized in accordance with the present disclosure. In some embodiments, a splicer 10 may be an arc discharge splicer. In these embodiments, the emitted heat for splicing and otherwise manipulating fibers is arc discharge heat. In other embodiments, a splicer 10 may be a $CO_2$ splicer. In these embodiments, the emitted heat for splicing and otherwise manipulating fibers is $CO_2$ laser heat. Suitable splicers for use in accordance with the present disclosure are available from AFL Telecommunications LLC and Fujikura Ltd.

Figure 7:
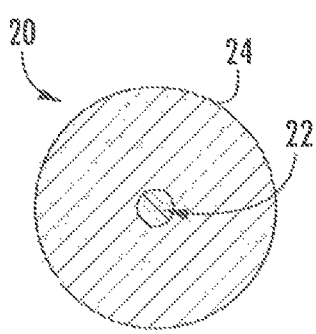
FIG. 7 is a cross-sectional view of a first fiber in accordance with embodiments of the present disclosure.
Figure 8:
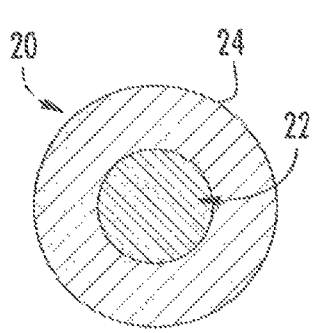
FIG. 8 is a cross-sectional view of a first fiber in accordance with other embodiments of the present disclosure.
Figure 9:
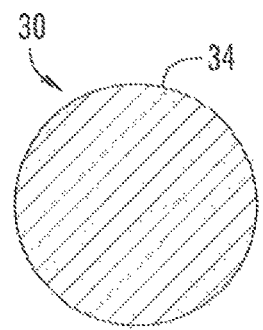
FIG. 9 is a cross-sectional view of a second fiber in accordance with embodiments of the present disclosure.

Referring now to FIGS. 7 through 9, embodiments of first fibers 20 and second fibers 30 are provided. A first fiber 20 in accordance with the present disclosure may be a single mode fiber as illustrated in FIG. 7, or a multi-mode fiber as illustrated in FIG. 8. A first fiber 20 may thus include a core 22 and a cladding 24 surrounding the core 22. The core 22 is typically formed from germanium, while the cladding 24 is typically formed from silica. The core 22 of a single mode fiber may be smaller in diameter than the core of a multi-mode fiber, as generally understood. For example, the core 22 of a single mode fiber may have a maximum outer diameter of between approximately 7 and approximately 11 micrometers. The core 22 of a multi-mode fiber may have a maximum outer diameter of between approximately 40 and approximately 100 micrometers. The cladding 24 may have a maximum outer diameter (when utilized with a single mode fiber or multi-mode fiber) of between approximately 40 and approximately 2000 micrometers, such as between approximately 40 and approximately 150 micrometers (such as for the optical sensing industry), between approximately 120 and approximately 150 micrometers (such as for the telecom industry), or between approximately 120 and approximately 2000 micrometers (such as for the medical and fiber laser industries).

A second fiber 30 in accordance with the present disclosure is a coreless silica fiber, as illustrated in FIG. 9. The second fiber 30 thus includes a cladding 34, but does not include a core 32 surrounded by the cladding 34. Accordingly, the cladding 34 has a solid cross-sectional profile, as illustrated. The cladding 34 is, as stated, silica. The cladding 34 may have a maximum outer diameter of between approximately 40 and approximately 2000 micrometers, such as between approximately 40 and approximately 150 micrometers, between approximately 120 and approximately 150 micrometers, or between approximately 120 and approximately 2000 micrometers. Notably, the maximum outer diameter of a second fiber 30 in accordance with the present disclosure may be approximately equal to the maximum diameter of a first fiber 20 with which the second fiber 30 is to be connected.

Referring now to 6, an optical fiber assembly 40 in accordance with the present disclosure may include a first fiber 20 and a tip portion 36, such as of a second fiber 30, which is connected to the first fiber 20. The tip portion 36 may be a portion of the optical fiber assembly 40 that includes a tip 42 of the assembly 40. The tip 42 may have a down-tapered shape, as illustrated. Further, a tip angle 44 may be defined for the tip 42, as illustrated. The tip angle 44 may, for example, be measured at a location 46 that is spaced from the tip 42 by between 5 and 15% of the diameter of the cladding 34, and based on opposing (180 degrees apart along the circumference of the cladding 34) tangent lines to that location 46 as illustrated. In exemplary embodiments, the tip angle 44 may be between 70 and 100 degrees.

In exemplary embodiments, the tip portion 36 (such as a component thereof which includes the tip 42) may be heat polished, as discussed herein.

The tip portion 36 and first fiber 20 may be connected along longitudinal axes 21, 31 thereof, such that the longitudinal axes of the tip portion 36 and first fiber 20 are coaxial. Accordingly, ends of the tip portion 36 and first fiber 20 may abut against each other, as illustrated.

Referring now to FIGS. 2 through 5, various steps utilized during formation of optical fiber assemblies 40 are illustrated. The present disclosure is further directed to methods for forming optical fiber assemblies 40, and such methods may include such steps as described herein.

For example, a method in accordance with the present disclosure may include, for example, the step of aligning a first fiber 20 and a second fiber 30 together. Such alignment may occur such that ends of the fibers 20, 30 abut together and the longitudinal axes 21, 31 of the fibers 20, 30 are coaxial. The alignment may be performed manually or in an automated fashion, such as by a splicer in preparation for splicing.

A method in accordance with the present disclosure may further include, for example, the step of splicing the first fiber 20 and second fiber 30 together. Such splicing may be performed using a heat source 14 such as, for example, $CO_2$ laser heat or arc discharge heat, and may be performed by a suitable splicer 10 as discussed herein. When $CO_2$ laser heat is utilized, the heat may for example be generated at between 5 and 20 Watts. When arc discharge heat is utilized, the heat may for example, be generated at between 10 and 16 milliamps.

A method in accordance with the present disclosure may further include, for example, the step of moving the spliced together first fiber 20 and second fiber 30 relative to the heat source 14. Such movement may occur, for example, along the longitudinal axes 21, 31. The fibers 20, 30 may be moved such that a splice location 48 is spaced longitudinally from the heat source 14 by a predetermined distance 50. The predetermined distance may, for example, be between 0.2 and 2 millimeters. The movement may be in the direction such that, after such movement, the fiber 30 is adjacent and exposed to the heat source 14 for heating as shown.

A method in accordance with the present disclosure may further include, for example, the step of heating the second fiber 30. Such step may occur after the splicing and moving steps. Such heating may be performed using a heat source 14 such as, for example, $CO_2$ laser heat or arc discharge heat, and may be performed by a suitable splicer 10 as discussed herein. When $CO_2$ laser heat is utilized, the heat may for example be generated at between 5 and 20 Watts. When arc discharge heat is utilized, the heat may for example, be generated at between 10 and 16 milliamps. In exemplary embodiments, the heat source for such heating is the same as the heat source for splicing.

A method in accordance with the present disclosure may further include, for example, the step of applying a tensile force 52 to the second fiber during heating of the second fiber 30. The tensile force 52 may be applied along the longitudinal axes 21, 31 as illustrated, and may be applied in any suitable matter. For example, suitable components of the splicer 10 may be utilized to apply the tensile force 52. In exemplary embodiments, the tensile force may be applied, for example, at a speed of between 0.05 and 0.2 millimeters per second.

A method in accordance with the present disclosure may further include, for example, the step of discontinuing application of the tensile force when a minimum neck thickness 54 of the second fiber 30 is below a neck thickness threshold. The minimum neck thickness 54 is a thickness at a location of minimum diameter of the second fiber 30 that is created during application of the heat and tensile force as described herein, and indicates a subsequent separation of the second fiber 30 into the tip portion 36 and a detached portion 38. The detached portion 38 is not connected to the first fiber 20, while the tip portion 36 is connected to the first fiber 20 to form the optical fiber assembly 40 as described herein. In exemplary embodiments, the neck thickness threshold is between 10 and 50 micrometers. Notably, in exemplary embodiments, such discontinuing of tensile force application occurs immediately after the minimum neck thickness 54 is detected as less than the neck thickness threshold, and before actual separation of the second fiber 30 into the tip portion 36 and the detached portion 38.

A method in accordance with the present disclosure may further include, for example, the step of continuing heating during and after discontinuing of the tensile force application. Such continued heating may facilitate separation of the second fiber 30 into the tip portion 36 and the detached portion 38.

A method in accordance with the present disclosure may further include, for example, the step of discontinuing heating after discontinuing application of the tensile force and after the second fiber 30 has separated into the tip portion 36 and the detached portion 38. As discussed, the tip portion 36 may be connected to the first fiber 30 to form the optical fiber assembly 40.

A method in accordance with the present disclosure may further include, for example, the step of heat polishing the tip 42 of the tip portion 36 (and optical fiber assembly 40) to the desired tip angle 44, as discussed herein. Such step may occur, for example, after the second fiber 30 has separated into the tip portion 36 and the detached portion 38. Such heat polishing may be performed using a heat source 14 such as, for example, $CO_2$ laser heat or arc discharge heat, and may be performed by a suitable splicer 10 as discussed herein. When $CO_2$ laser heat is utilized, the heat may for example be generated at between 5 and 20 Watts. When arc discharge heat is utilized, the heat may for example, be generated at between 10 and 16 milliamps. In exemplary embodiments, the heat source for such heat polishing is the same as the heat source for splicing and heating. Notably, the heat polishing in exemplary embodiments may occur at a heating power that is less than the heating power used for the splicing step and the heating step. In exemplary embodiments, the heat polishing may occur at between 50% and 80% of the heating power used for the splicing step and the heating step.

Additionally, in some embodiments, the optical fiber assembly 40 may be rotated (such as about axes 21, 31) during the step of heat polishing. Such rotation may advantageously reduce or prevent tip bending due to gravity during heat polishing. Such rotation may, for example, be continuous during the step of heat polishing. The rotation may occur, for example, at a rotation speed of between 20 and 250 degrees per second.

Notably, methods as disclosed herein, including in exemplary embodiments all steps as disclosed herein or sub-sets thereof, may be performed relatively quickly and efficiently. For example, a method in accordance with the present disclosure may in exemplary embodiments be performed in less than 2 minutes, such as in less than 1 minute and 30 seconds, such as in less than 1 minute and 15 seconds, such as in less than or equal to one minute.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming an optical fiber assembly, the method comprising:
    splicing a first fiber and a second fiber together, wherein the first fiber is one of a single mode optical fiber or a multi-mode optical fiber and the second fiber is a coreless silica fiber;
    heating the second fiber;
    applying a tensile force to the second fiber during heating of the second fiber;
    discontinuing application of the tensile force when a minimum neck thickness of the second fiber is below a neck thickness threshold; and
    discontinuing heating after discontinuing application of the tensile force and after the second fiber has separated into a tip portion and a detached portion, the tip portion connected to the first fiber.

2. The method of claim 1, further comprising heat polishing a tip of the tip portion to a desired tip angle.

3. The method of claim 2, wherein the heat polishing occurs at between 50% and 80% of the heating power used for the splicing step and the heating step.

4. The method of claim 2, wherein the desired tip angle is between 70 and 100 degrees.

5. The method of claim 1, wherein the splicing and heating steps are performed using $CO_2$ laser heat.

6. The method of claim 1, wherein the splicing and heating steps are performed using arc discharge heat.

7. The method of claim 1, wherein the neck thickness threshold is between 10 and 50 micrometers.

8. The method of claim 1, wherein the tensile force is applied at a speed of between 0.05 and 0.2 millimeters per second.

9. A method for forming an optical fiber assembly, the method comprising:
- splicing a first fiber and a second fiber together, wherein the first fiber is one of a single mode optical fiber or a multi-mode optical fiber and the second fiber is a coreless silica fiber;
- heating the second fiber;
- applying a tensile force to the second fiber during heating of the second fiber;
- discontinuing application of the tensile force when a minimum neck thickness of the second fiber is below a neck thickness threshold;
- discontinuing heating after discontinuing application of the tensile force and after the second fiber has separated into a tip portion and a detached portion, the tip portion connected to the first fiber; and
- heat polishing a tip of the tip portion to a desired tip angle, wherein the desired tip angle is between 70 and 100 degrees.

10. The method of claim 9, wherein the heat polishing occurs at between 50% and 80% of the heating power used for the splicing step and the heating step.

11. The method of claim 9, wherein the splicing, heating and heat polishing steps are performed using $CO_2$ laser heat.

12. The method of claim 9, wherein the splicing, heating and heat polishing steps are performed using arc discharge heat.

13. The method of claim 9, wherein the neck thickness threshold is between 10 and 50 micrometers.

14. The method of claim 9, wherein the tensile force is applied at a speed of between 0.05and 0.2 millimeters per second.

* * * * *